(12) United States Patent
Löfbacka et al.

(10) Patent No.: US 10,674,653 B2
(45) Date of Patent: Jun. 9, 2020

(54) STONE PICKER AND RELATED METHODS (71) Applicant: OY EL-HO AB, Bennäs (FI)

(72) Inventors: Johan Löfbacka, Purmo (FI); Filip West, Jakobstad (FI); Joakim Löfvik, Bennäs (FI)

(73) Assignee: OY EL-HO AB, Bennäs (FI)

(*) Notice: Subject to any disclaimer, the term of this patent is extended or adjusted under 35 U.S.C. 154(b) by 95 days.

(21) Appl. No.: 15/742,235

(22) PCT Filed: Jul. 5, 2016

(86) PCT No.: PCT/FI2016/000018
§ 371 (c)(1),
(2) Date: Jan. 5, 2018

(87) PCT Pub. No.: WO2017/009521
PCT Pub. Date: Jan. 19, 2017

(65) Prior Publication Data
US 2018/0192574 A1    Jul. 12, 2018

(30) Foreign Application Priority Data
Jul. 10, 2015    (FI) ...................................... 20150213

(51) Int. Cl.
*A01B 43/00*    (2006.01)
*A01B 63/32*    (2006.01)
(Continued)

(52) U.S. Cl.
CPC .............. *A01B 63/32* (2013.01); *A01B 43/00* (2013.01); *A01B 63/111* (2013.01);
(Continued)

(58) Field of Classification Search
CPC ...... A01B 43/00; A01B 43/005; A01B 63/112
See application file for complete search history.

(56) References Cited

U.S. PATENT DOCUMENTS

| | | |
|---|---|---|
| 3,540,534 A | 11/1970 | Rhoads |
| 3,627,053 A | 12/1971 | Hook et al. |

(Continued)

FOREIGN PATENT DOCUMENTS

| | | |
|---|---|---|
| CS | 263662 | 8/1989 |
| EP | 2 524 587 | 11/2012 |

(Continued)

OTHER PUBLICATIONS

Search Report issued in EP Appln. No. 16823936.6 dated Mar. 15, 2019.

(Continued)

*Primary Examiner* — Matthew Troutman
(74) *Attorney, Agent, or Firm* — Nixon & Vanderhye P.C.

(57) ABSTRACT

Hydraulic solutions on a to a tractor or equivalent connected work machine, where the work machine shows several hydraulic driven work units and hydraulic motors, and where the hydraulic motors are so mounted and connected that the pressure drop over the hydraulic motor of the most congested work unit also in static conditions can increase markedly over the system pressure of the hydraulic power source that drives the work machine and where the rotors of the hydraulic driven working units can be reversed to free a possible blockage.

17 Claims, 4 Drawing Sheets

(51) Int. Cl.
*A01B 63/111* (2006.01)
*F15B 11/16* (2006.01)

(52) U.S. Cl.
CPC .......... *A01B 63/1112* (2013.01); *F15B 11/16* (2013.01); *F15B 2211/7051* (2013.01); *F15B 2211/7058* (2013.01); *F15B 2211/7135* (2013.01)

(56) References Cited

U.S. PATENT DOCUMENTS

| | | | |
|---|---|---|---|
| 3,670,822 A | 6/1972 | Reinhardt | |
| 4,040,489 A | 8/1977 | Hulicsko | |
| 4,637,474 A | 1/1987 | Leonard | |
| 5,430,999 A | 7/1995 | Grant | |
| 5,511,368 A | 4/1996 | Kocher | |
| 7,658,233 B1 * | 2/2010 | Aho | A01B 43/00 171/63 |
| 2016/0029539 A1 | 2/2016 | Aho | |

FOREIGN PATENT DOCUMENTS

| | | |
|---|---|---|
| FR | 2 595 185 | 9/1987 |
| JP | 2001-018673 | 1/2001 |
| WO | WO 2011/078846 | 6/2011 |
| WO | WO 2015/019942 | 2/2015 |

OTHER PUBLICATIONS

International Search Report for PCT/FI2016/000018, dated Nov. 4, 2016, 5 pages.
Written Opinion of the ISA for PCT/FI2016/00018, dated Nov. 4, 2016, 8 pages.
Search Report for FI 20150213, dated Mar. 10, 2016, 3 pages.
Kongskilde Stonebear S Stonecollector [electronic document], May 2003, www.kongskilde.com—Agriculture—Soil preparation—Stone collecting—Juko Stonebears—Manuals.
Brochure for "The Degelman Strawmaster" Presentation of model Signature 7200: http://www.degelman.com/products/agricultural_equipment/rock_pickers_rakes/signature/index.php , 16 pages.

* cited by examiner

STONE PICKER AND RELATED METHODS

This application is the U.S. national phase of International Application No. PCT/FI2016/000018 filed 5 Jul. 2016 which designated the U.S. and claims priority to FI Patent Application No. 20150213 filed 10 Jul. 2015, the entire contents of each of which are hereby incorporated by reference.

FIELD OF THE INVENTION

This innovation is related to a stone picker, especially hydraulic solutions to automatically optimize the load for a stone picker connected to a tractor or a base machine. Whereby at least part of the weight of the stone picker during work is transmitted to a tractor or base machine and where the stone picker comprises as well hydraulic motors as hydraulic cylinders.

BACKGROUND OF THE INVENTION

As the cultivated area per farm has increased heavily during the last decades and new areas have been cultivated, the need to collect stones from arable fields has strongly increased.

A lot of different models of stone pickers have been presented in the patent literature as far as from early 1900 century, the oldest ones American or Canadian powered by horses, later powered by tractors and even self-propelled models.

From the simple (frequently British) tractor carried solutions presented in the patent literature in the late -50es and early -60es the Japanese started with their trailed solutions in the -70es. The USA and Canada have also during this whole period a lot of patent applications. These solutions were frequently intended to collect smaller stones in swaths, or different models of loading buckets to collect stones (from the swaths), or to take up single big stones, for example when new land was taken in cultivation.

In the USSR a big number of patent applications and utility models have been presented from early -80es until the Soviet dissolution.

As a forerunner to the solutions, also to those seen today as modern, can rightfully be considered the publication FR2595185 from March 1986. In this publication the Frenchman Maurice Tanguy presents a stone picker pulled by a tractor and equipped with a lifting rotor, that co-operate with a sieve, the front end of which penetrates the ground surface, collecting stones and transporting them to a tilting container positioned at the rear end of the stone picker.

The throwing rotor of the Tanguy solution is mounted in a separate frame, movable in relation to the sieve to enable also bigger stones to pass without blocking the rotor.

Thus the publication FR2595185 presents the basic central solution, that is most commonly used in Europe even today, particularly if complemented with the solution presented in the patent publication CS263662 by the Czech Miroslav Svoboda and Co.

The publication CS263662 presents a stone picker combined with the already known aligned stone rakes, one on each side in front of the lifting rotor. In this manner, it was made possible to increase the working width of the machine and to save one separate working operation, that is raking the stones in a swath.

One can quickly convince oneself, that these solutions presented in the mid 1980es still are dominating the market by checking on the internet the offers of today, and the producers of stone pickers.

As an example we can from the KIVI-PEKKA STONE PICKERS leaflet of PEL-Tuote Oy, Seppälänsalmentie 181, FI 58900 Rantasalmi, see how the Kivi-Pekka™ stone picker is build using the teachings from the French and the Czech solutions from 1986.

It is also possible to find a fairly similar solution on the Kongskilde stone picker leaflet: STONEBEAR™ SB4000/SB5200 (101001044 EXP/GB/Stonebear 4000/BRO/1017).

Characteristically both the rotating stone rakes and the lifting rotor of a stone picker are mechanically driven from the tractor PTO [power takeoff] by use of drive shafts, gearboxes and V-belts, showing as well benefits as disadvantages.

The benefit with the mechanical transmission is that it is possible by use of quite simple and well-known components to transmit enough power and torque by normal load without disruption.

However, the load on a stone picker is strongly pulsating all the time, as a stone rake collects a flow of small and middle sized stones to the lifting rotor. The load shows additionally sharp load peaks as single big stones enter the machine. If the stones are oversized or unsuitable formed and enter the machine in "wrong edge", blockage will occur.

Of course the mechanical transmission in known stone pickers is equipped with overload protections, but mostly these are really their Achilles' heel. Known types of overload protection used are multi disc friction clutches of standard type or, as in the above mentioned Kongskilde and PEL-Tuote machines, V-belt transmissions between the gearbox and the rotors.

The all-time pulsating load creates heating of the overload protections and as it is very difficult to equip these rotating components with an effective cooling. Therefor they easily are overheated and get unusable until their central components are replaced.

The drive torque for V-belts used as overload protection is extremely sensitive to dirt and moisture on the belts. If they got wet or dirty they have first to be cleaned and dried whereafter their pre-tension has to be checked and adjusted before the work can continue after an overload. That cleaning and the adjusting of the V-belts really is difficult, can clearly be understood thereby that for Kongskilde Stonebear™ the instructions for adjusting and cleaning the V-belts go over three pages in the instruction manual and include advise to grind the grooves in the pulleys when the machine is standing and to clean and dry the belts before the interrupted work can continue.

If the driver does not manage to disengage the PTO of the tractor immediately when overload occurs, these mechanical overload protections are very quickly overheated. The friction discs of the multidisc overload clutches get glazed and have to be replaced. The V-belts will burn and they also have to be replaced, adjusted and run in with due care during the run in period and thereafter readjusted checking the pre-tension rate during the run in time (if doubt, see the instruction manual of Stonebear™). All this additional work reduces the efficiency, gives expensive downtimes in the work and increases the risks concerning work safety.

Therefore the Canadian producer Degelman (Degelman Industries, 272 Industrial Drive, Regina, Saskatchewan S4P 3B1, Canada) for example, produces stone pickers equipped alternatively with mechanical or hydraulic transmissions. Check from Degelman Agricultural Equipment leaflet, the presentation of their model Signature™ 6000/7200.

The benefit of the mechanical transmission is that it can transmit high torques and the machine is therefore also able to collect big stones.

The easy reverse possibility for the collecting rotor, offered by the hydraulic transmission, is a big advantage during a blockage. Additionally the pressure relief valve of the hydraulic transmission gives a very reliable overload protection. The disadvantage is that the hydraulic capacity of most of the agricultural tractors normally available for this work, is not big enough with conventional solutions, to ensure the separate working units enough power to collect also big stones.

BRIEF DESCRIPTION OF THE INVENTION

To overcome these disadvantages with the known mechanical and hydraulic solutions for stone pickers, new hydraulic solutions according the present invention has been developed.

The most important benefits with these new hydraulic solutions are, that effective and almost maintenance free overload protections are available for each separate work unit, and that the rotation speed of the separate driven units remain at required level also if the load between themselves vary.

Furthermore a major advantage is that the load between the different driven units automatically is distributed to ensure that the heaviest loaded unit all time has access to spare power which the less loaded units does not momently use within the scope of the given maximal allowed drive power.

This ensures, that the working pressure in the system, and the hydraulic power taken from the tractor or the base machine is held on the lowest possible level all the time, as the system pressure is not desired by the most loaded work unit but by the total load.

Another big benefit is also that the cooling of the overload protections, in this case the pressure relief valves for the separate rotors, is very effective as new oil all time flows through and cools them at possible stand stills for the single work unit, or at a total stop of the whole system.

Neither is the overload limit sensitive for external dirt nor does it need to be readjusted after an overload as for the above described traditional solutions.

Furthermore it is easy to reverse the rotors when minor blockages occur. Therefor downtime during work will almost disappear and the efficiency of the machine can be optimally used at all time.

BRIEF DESCRIPTION OF THE DRAWINGS

Below an advantageous embodiment of the invention is described with use of the following drawings.

DETAILED DESCRIPTION OF THE INVENTION

Figure 1:
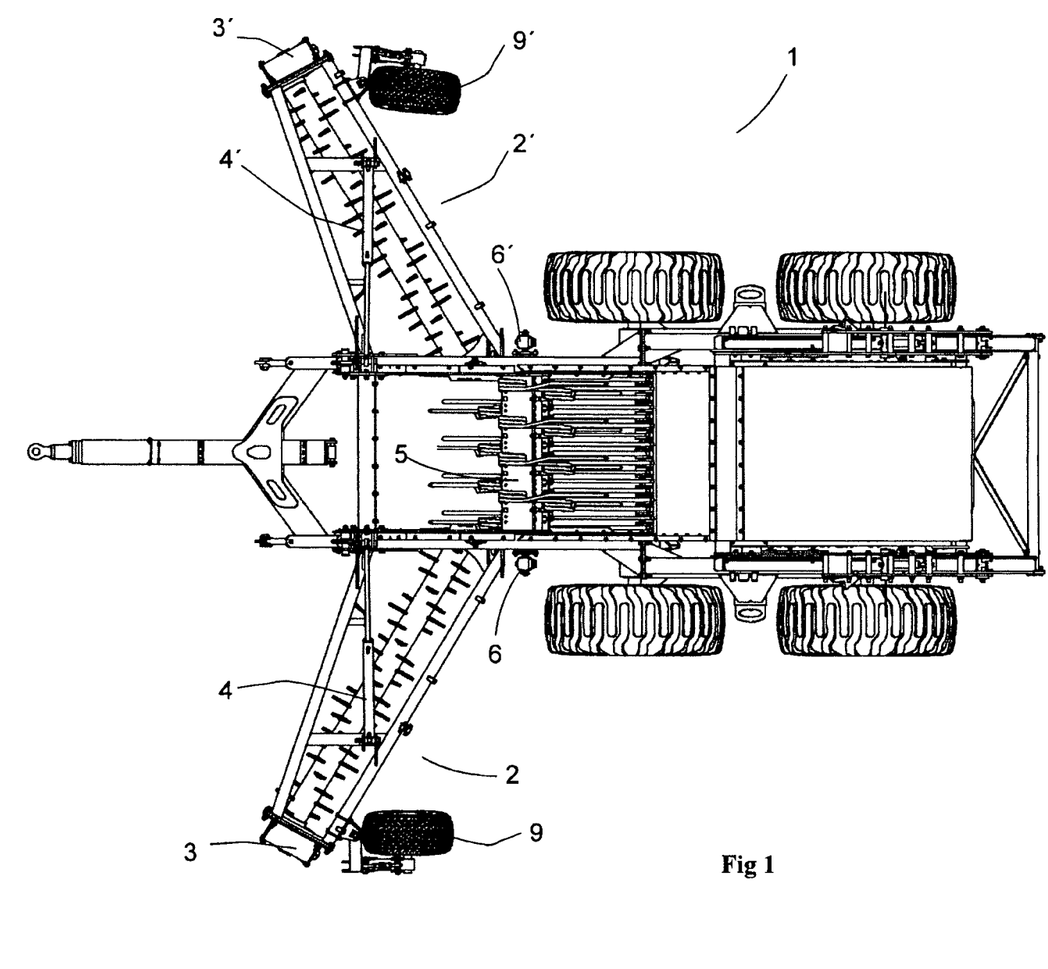
FIG. 1. Shows a top view of a stone picker, using the hydraulic solutions of the invention.

FIG. 1. Shows a top view of the stone picker 1, where, for the understanding of the invention, the most essential components are numbered. Left and right rake units 2 and 2' each of them comprising a centre-oriented raking rotor, hydraulic rake motors 3 and 3' for left and right rake units, lift cylinders 4 and 4' for left and right rake units, a lifting rotor 5, left and right hydraulic lift motors 6 and 6' for the lifting rotor and support wheels 9 and 9' for the rake units.

Figure 2:
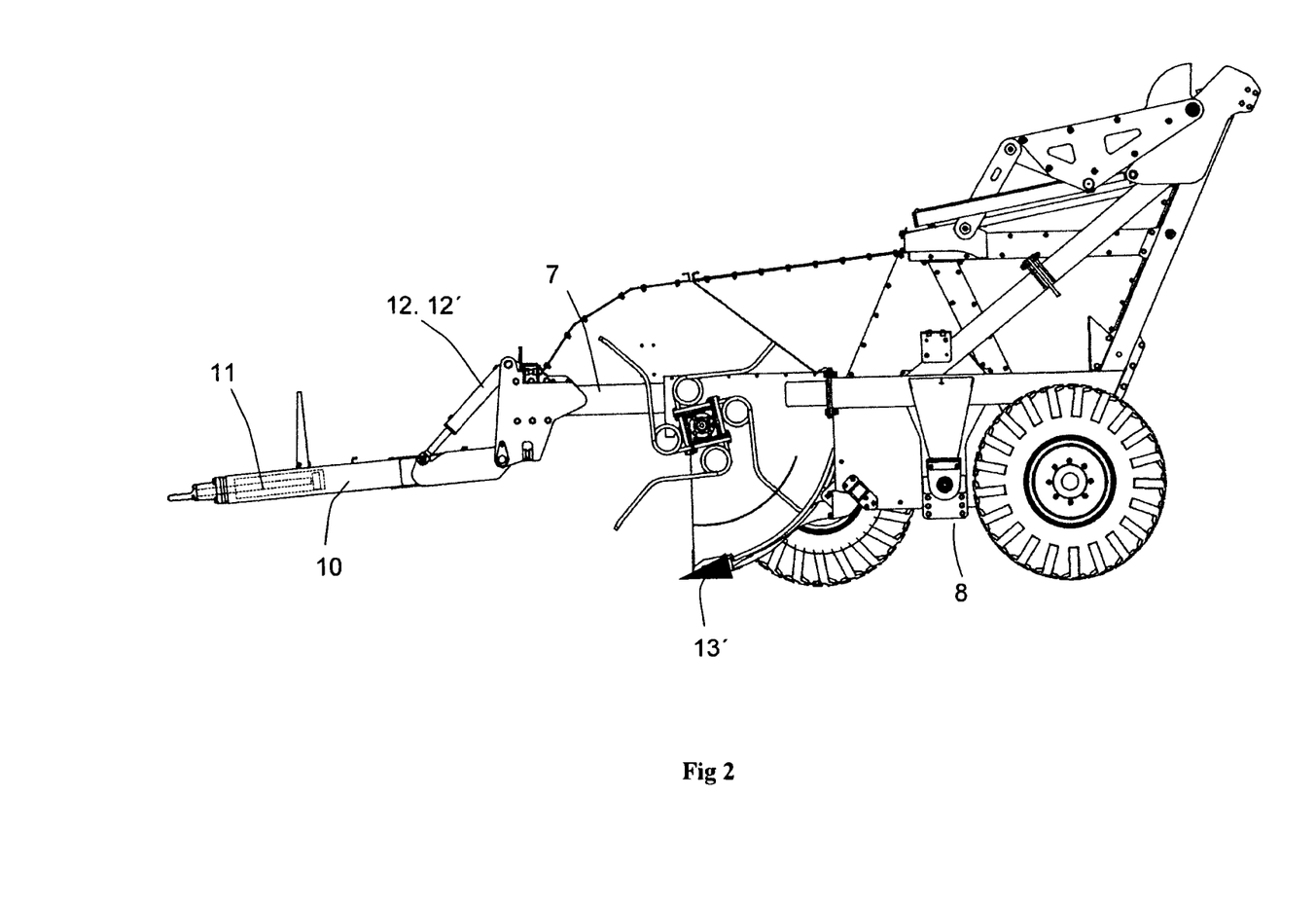
FIG. 2. Shows the same machine in a side view.

FIG. 2. Shows a side view of the stone picker 1, where, for the understanding of the invention, the most essential components are numbered. A carrier frame 7, with a tandem unit 8, a drawbar 10, a drawbar pull cylinder 11, drawbar height adjustment cylinders 12 and 12' and a sieve head 13'.

Figure 3:
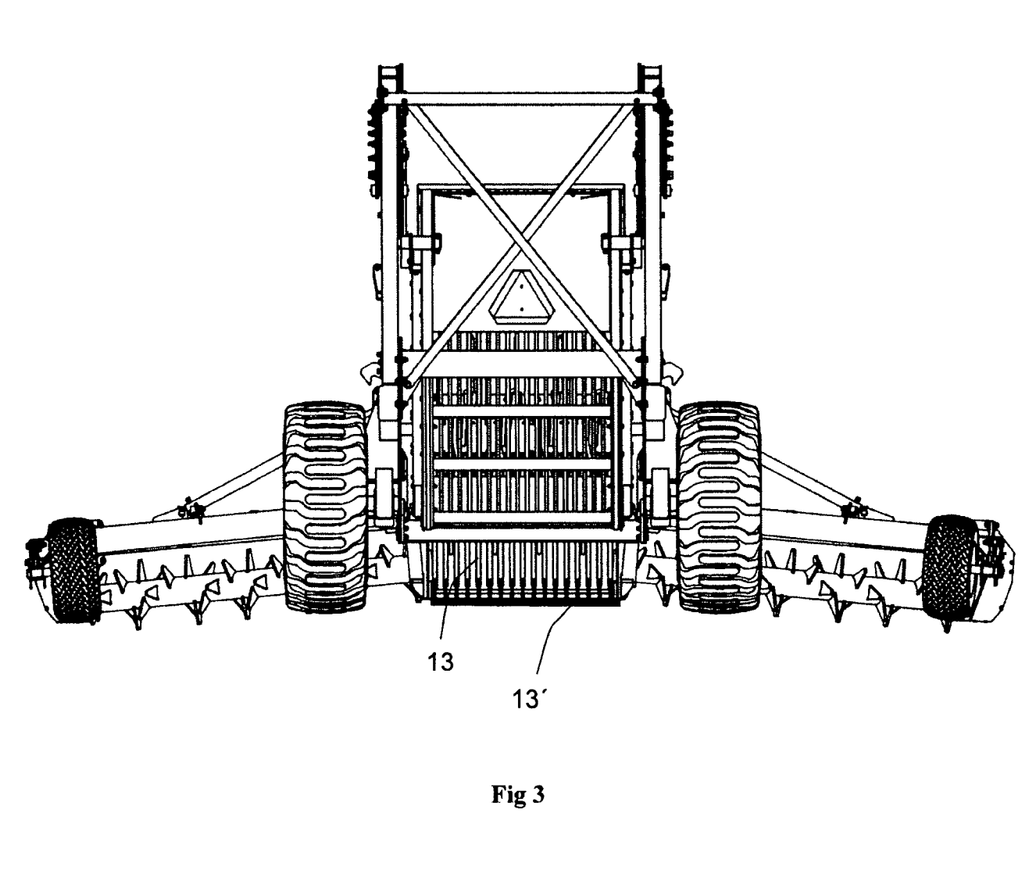
FIG. 3. Shows the same machine in a rear view.

FIG. 3. Shows a rear view of the stone picker, where, for the understanding of the invention, the most essential components are numbered. A sieve 13 arranged under the lifting rotor 5 and the undermost sieve head 13'.

Figure 4:
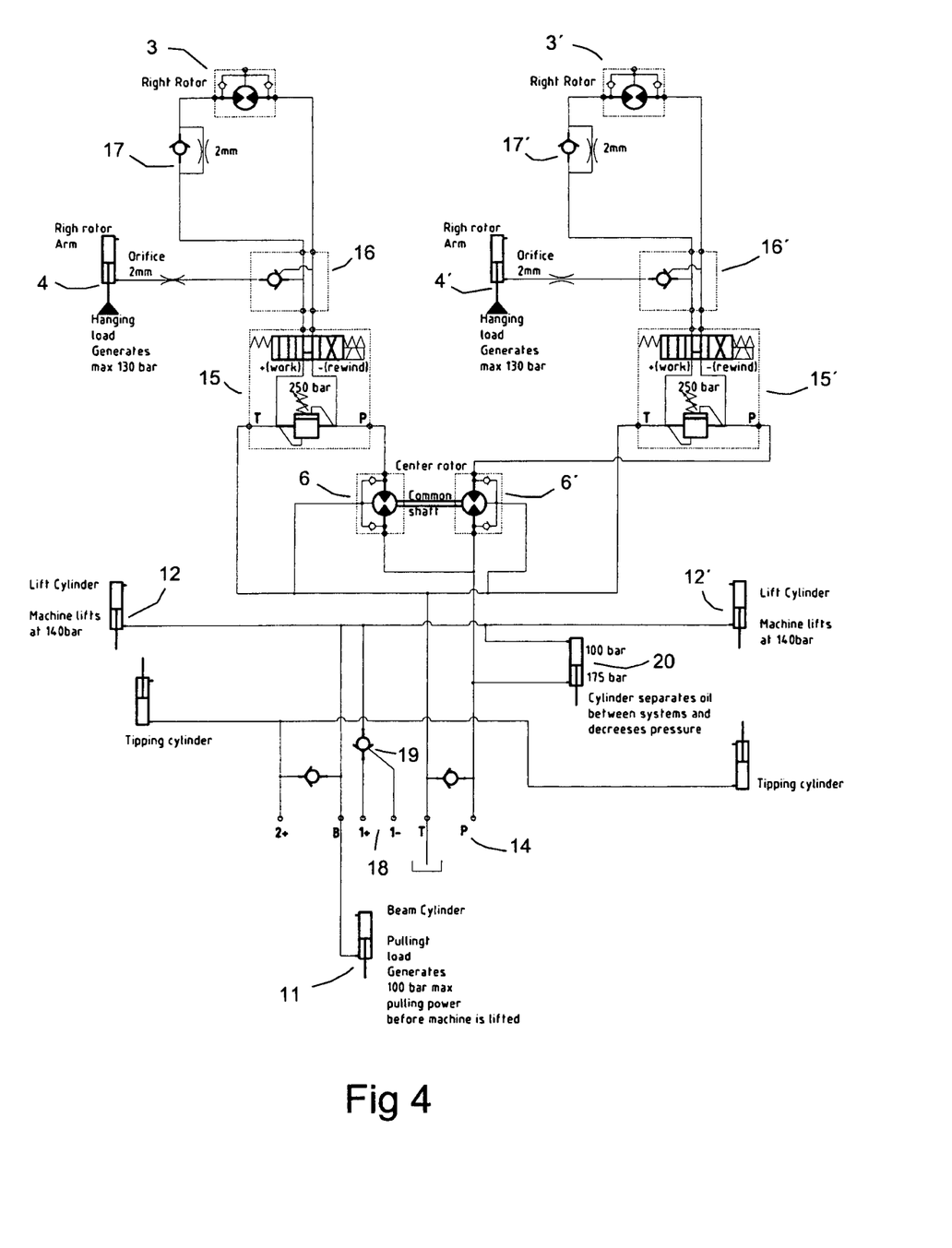
FIG. 4. Shows a typical hydraulic scheme for the hydraulic solutions according to the present invention.

FIG. 4 shows the hydraulic scheme of the stone picker, where, for the understanding of the invention, the most essential components are numbered as follows.

The rotor drive circuit: A external hydraulic pressure connection 14 of a tractor, a control cylinder 20, the left and right hydraulic motors 6 and 6' for the lifting rotor 5, control valves 15 and 15' for the left and right rake units 2 and 2' respectively, pilot operated check valves 16 and 16' for the left and right lift cylinders 4 and 4 of the left and right rake units respectively, left and right non-return valves 17 and 17' with restricted bypass, the hydraulic motors 3 and 3' for the left and right rake units.

Height adjustment circuit: An external double acting connection 18 of the tractor, a pilot operated check valve 19, the left and right height adjustment cylinders 12 and 12', the drawbar pull cylinder 11 and the control cylinder 20.

Only one double acting and one single acting connection+ free return is used for the hydraulic connection to the tractor. No electrically or cable-operated hydraulic valves are needed from the tractor.

A hydraulic solution according to the present advantageous embodiment is described in view of the stone picker 1 mounted to an agricultural tractor or equivalent base machine (not shown). Such a stone picker comprises at least one non-rotating centrally arranged work unit comprising a sieve 13 and a sieve head 13'. When the front end—the sieve head—of the sieve penetrates ground surface collecting stones therefrom the lifting rotor 5, arranged above the sieve, will transport the stones to a container positioned at the rear end of the stone picker. Furthermore there is least one rotating rake unit 2 and 2', co-operating with the sieve. This rake unit, being forward aligned and comprising raking rotors furnished with pikes, is used to transport stones in front of the sieve. Hereby the lifting rotor is driven by at least one hydraulic motor 6, 6' preferably connected to a common shaft. Whereas the rake units are driven by at least one hydraulic motor 3, 3'. The position of the sieve and the rake units are administrated by at least one hydraulic cylinder 4, 4', 12 and 12'.

The function of the hydraulic solutions according the invention is as follows:

The mechanical transport security lock (not shown) for the rake units 2, 2' are opened. The external hydraulic pressure connection 14 of the tractor is activated and the lifting rotor 5 starts. As the operating valves 15 and 15' for the rake units 2 and 2' are activated in +position, the rake units are lowered, since the return pressure from the hydraulic motors 3 and 3' of the rake units is big enough to open the check valves 16 and 16'.

Both of the rake units 2, 2' now keep the same speed, as they are driven by the return oil from the equally sized hydraulic motors 6 and 6', which are synchronized with each other through a common shaft of the lifting rotor 5. The hydraulic motors therefore distribute the oil from the tractor evenly to both of the rake units independent of their load.

The required working depth is set by the external hydraulic connection 18 of the tractor. While working the pilot operated check valve 19 prohibits the oil from leaking out of the height adjusting cylinders 12 and 12' back to the tractor.

When the stone picker 1 is operating normally, the pressure in the height adjustment cylinders 12 and 12' is equal high as the pressure on the piston rod side in the pull cylinder 11 of the drawbar.

If the sieve 13 of the stone picker 1 tends to sink to deep, the pulling resistance thereof will increase and the pressure in the pull cylinder 11 of the drawbar will increase. Then oil is led from this cylinder 11 to the high adjustment cylinders 12 and 12' and the working depth will decrease.

Here we have a kind of an automatic depth control based on the pulling resistance, which is depending on how deep the sieve head 13' penetrates into the soil and how firm the soil is. If a manual control is needed the driver of the stone picker may always regulate the oil supply to the actuators 4, 4', 12 and 12' displacing the automatic depth control.

The working depth of the sieve head 13' also determines the working depth of the lifting rotor 5 as well as the working depth of centre-oriented raking rotors of the rake unit s 2 and 2'. At increased working depth and/or at heavier soil or by increased stone presence or by increased working speed, the rotation resistance for the lifting rotor 5 and the rake units 2 and 2' does increase, most of course for the lifting rotor but also for the rake units.

The height adjustment cylinder or height adjustment cylinders 12, 12' and the hydraulic motor or motors of the Lifting rotor 5 and rake units 2, 2' are hydraulically separated from each other with two single acting cylinders 20, These cylinders being mechanically connected with each other. Hereby avoiding the oil in the two hydraulic circuits to mix with each other.

From the hydraulic scheme we can see that the piston-rod side of the control cylinder 20 is connected to the pressure side of the hydraulic motors 6 and 6', while the piston side of the cylinder 20 is connected to the height adjustment cylinders 12 and 12'. The hydraulic cylinders and the hydraulic motors of the lifting rotor and the rake units are hereby hydraulically separated from each other. The control cylinder 20 thus separates the oil in the rotor drive circuit and in the height adjustment circuits from each other, but keeps the pressure relation between the pressure in these circuits on a level corresponding to the area relation between the both chambers of the control cylinder 20.

This means that the higher rotation resistance the lifting rotor and the rake units are subjected to, the more oil will be pressed out of the control cylinder 20 to the height adjustment cylinders 12 and 12' and contrary, the lower the rotation resistance for the lifting rotor and the rake units is, the more oil is let out from the height adjustment cylinders 12 and 12' to the cylinder 20, whereby the working depth of the stone picker 1 will increase.

Thereby a load adapting depth regulation is obtained that not only takes in account the pulling resistance, but the depth adjustment is regulated as a function of all the parameters: working depth, soil stiffness, stone presence, working speed and the rotation speed of the lifting rotor and the rake units. If the depth control is marked by Z, this adjustment can be written as a function:

$$Z = f(\Delta \text{working depth}, \Delta \text{soil stiffness}, \Delta \text{stone presence}, \Delta \text{working speed}, \Delta \text{rotation speed}).$$

The area ratio between the piston- and piston rod sides of the control cylinder 20 determinates, to what amount the parameters depended on the rotation resistance influence the depth control, compared to the influence of those parameters, which only are related to the pulling force in the drawbar.

Hereby the area ratio, of control cylinder 20 decides how the ratio between the registered rotation resistance and the registered pulling resistance of the stone picker 1 lifting rotor 5, rake units 2, 2', sieve 13 and sieve head 13' affects the length of the drawbar pull cylinder 11, or the height adjustment cylinders 12, 12'.

Thus it often can be a benefit to connect a second cylinder with another area ratio in parallel to the control cylinder 20, hereby getting the possibility to adjust what influence (how heavily) the different parameters will have on the load depending depth control Z during work.

It should also be noted, that not only does the control cylinder 20 separate the oil in the hydraulic motors 6 and 6' and the height adjustment cylinders 12, 12' from each other, but the volume of chamber of the control cylinder 20 connected to the height adjustment cylinders 12 and 12' will also limit the working area of the load depending depth control. The automatic depth control will thereby be easy to oversteere by laying in or laying out oil manually from the height adjustment cylinder/cylinders.

Owing to the present solution the length of the height adjustment cylinders 12 and 12' are, within the scope of a limited work range of the automatic depth control, automatically adapted as well to the pulling resistance of the stone picker 1 as to the rotation resistance of its rotating work units 5, 2 and 2'. This adaption is implemented without supply of any extern pressure fluid to the height adjustment circuit, during work. The adaption is also achievable without use of electrically, hydraulically or mechanically controlled metering units.

When we look at the rotor drive we can also note that both of the hydraulic motors 6, 6' of the lifting rotor 5 also does work as flow dividers and so synchronize the speed between therake units 2, 2'.

When we look at the dynamic pressure drop over the hydraulic motors 3, 3' and 6, 6' we can look at a situation where the load on the left rake unit 2 increases while the load on the right hand rake unit 2' remains constant, for instance. The pressure drop over the hydraulic motor 3 of the left hand rake unit will increase. This results in a decreasing of the pressure drop over the left hydraulic motor 6 of the lifting rotor 5. The two hydraulic motors 6 and 6' do therefore give different torque on the common shaft of the lifting rotor 5. In an extreme case the left hydraulic motor is driven by the lifting rotor instead of giving part of its effect to the lifting rotor. The left hydraulic motor will then act as a pump and can increase the working pressure of the hydraulic motor 3 of the left rake unit to the maximum pressure limit of the control valve 15, thus considerably much higher than the system pressure of the external hydraulic source.

The connection of the hydraulic motors according to the present innovation, results in a power distribution between the hydraulic motors of the three rotors and supplies the maximum power to that hydraulic motor that instantaneous has the highest external load. Here is not only the hydraulically supplied power used, but also the kinetic energy stored especially in the heavy lifting rotor 5 with large diameter. In a corresponding way kinetic energy stored in the right hand raking rotor of the rake unit 2 is used to help the hydraulic motor 3 of the left hand raking rotor of the rake unit 2' over the load peak and vice versa.

If the load of the hydraulic motor of the left hand raking rotor is all too big, the pressure relief valve of the control valve 15 will open at a pressure of 250 bar and oil is then free to bypass the motor 3 to tank. Even if a heavy heating will occur during such an overload, an effective cooling of said overload protection is presented by the continuous oil flow through the valve. Thus, the relief pressure of the valve is kept on an even level without need of readjustment, cleaning operations or changing of parts as usually is the case by the traditional overload protections that up to now have been dominating in the stone pickers on the market.

Furthermore at least one lift cylinder 4, 4' of the hydraulic driven rake units 2, 2' is connected to the return line of the hydraulic motor 3, 3' of the rake unit and that between the lift cylinder and the hydraulic motor is an one way restrictor valve 17, 17'. This valve will increase the pressure in the return line when the motor 3, 3' is reversed, whereby the rake unit 2, 2' will automatically be offloaded from the ground as the motor thereof is reversed. Thus the rotor may be freed from a blockage and the reverse speed of the rotor is simultaneously reduced.

If the raking rotor tends to stop because of tree roots or branches winding around it, or because of a suitably shaped stone that itch in between throw fingers and the frame thereof, then it is only necessary to reverse the control valve 15 of the hydraulic solution according the present innovation. The oil will then be directed to the lift cylinder 4 of the rake unit and release the unit from the ground. Simultaneously a part of the oil will flow through the restricted bypass of the one way restrictor valve 17 to slowly reverse the raking rotor to release the blockage. Thus work can be continued with a minimum of standstill and with maximum of safety for the driver.

The fact that the load on the raking rotor of the rake unit first is automatically reduced by the oil supplied to the lift cylinder 4 will of course help to reverse the rotor and release the blockage.

As the above-described examples shows, the hydraulic solution of the present innovation has many advantages compared to the state of the art hydraulic solutions in stone pickers. The work machine does of course not need to be a stone picker, but can be any work machine getting its hydraulic power supply from a base machine and the own weight of which at least partly is unloaded by this. The number of driven rotors is neither limited to two, but can be any number.

The area of use is neither limited to a within the agriculture used working machine, but can be for example a machine used within road or landscape construction and many variations are possible within the scope of the patent claims below.

REFERENCE NUMBER LIST

Ref Name/Description
1 Stone picker
2 Left rake unit
2' Right rake unit
3 Hydraulic motor of left rake unit
3' Hydraulic meter of right rake unit
4 Lift cylinder of left rake unit
4' Lift cylinder of right rake unit
5 Lifting rotor
6 Left hydraulic motor of lifting rotor
6' Right hydraulic meter of lifting rotor
7 Main frame
8 Tandem unit
8 Support wheels for the rake units
10 Drawbar
11 Pull cylinder of the drawbar
12 Height adjusting cylinder left
12' Height adjusting cylinder right
13 Sieve beneath the lifting rotor
13' Sieve head
14 Tractor external hydraulic connection pressure
15 Control valve of left rake unit
15' Control valve of right rake unit
16 Pilot operated check valve of left lift cylinder
16' Pilot operated check valve of right lift cylinder
17 Non-return valve with restricted bypass left
17' Non-return valve with restricted bypass right
18 Tractor external double acting hydraulic connection
19 Pilot operated check valve
20 Control cylinder

The invention claimed is:

1. A stone picker connected to an agricultural tractor, the stone picker comprising:
    a lifting rotor;
    at least one first hydraulic motor configured to drive the lifting rotor;
    a sieve comprising a sieve head arranged beneath the lifting rotor;
    left and right rake units comprising center-oriented raking rotors;
    at least one second hydraulic motor configured to drive the rake units; and
    first, second, and third hydraulic cylinders, wherein
    the first hydraulic cylinder comprises a drawbar pull cylinder configured to determine a pulling resistance applied by the stone picker,
    the second hydraulic cylinder comprises a height adjusting cylinder, and
    the third hydraulic cylinder comprises a control cylinder, whereby
    the drawbar pull cylinder, the height adjusting cylinder, and the at least one first hydraulic motor are connected to the control cylinder such that
    the drawbar pull cylinder and the height adjusting cylinder are connected to a first chamber of the control cylinder, whereby
    the control cylinder is arranged to keep a pressure relation between pressure in opposite circuits leveled, whereby
    the opposite circuits comprise a first circuit comprising the drawbar pull cylinder and the height adjusting cylinder is connected to the first chamber of the control cylinder, and
    a second circuit comprising the at least one first hydraulic motor driving the lifting rotor is connected to a second chamber of the control cylinder,
    said leveled pressure relation being set by an area relation between said first and second chambers of said control cylinder.

2. The stone picker according claim 1 further comprising a fourth hydraulic cylinder with a second area ratio between chambers therein is connected in parallel with the third hydraulic cylinder.

3. The stone picker according to claim 1, wherein
    at least one lift cylinder of the left and right rake units is connected to a return line of the at least one second hydraulic motor configured to drive the rake units, and
    a one way restrictor valve is arranged in a line connecting the at least one lift cylinder and the at least one second hydraulic motor,
    the one way restrictor valve being set to increase a pressure in the return line when the motor is reversed, such that at least one of the left and right rake units lifts above a ground surface when the at least one second hydraulic motor thereof is reversed to free the rake unit from a blockage.

4. The stone picker according to claim 2, wherein
at least one lift cylinder of the left and right rake units is connected to a return line of the at least one second hydraulic motor configured to drive the rake units, and
a one way restrictor valve is arranged in a line connecting the at least one lift cylinder and the at least one second hydraulic motor,
the one way restrictor valve being set to increase a pressure in the return line when the motor is reversed, such that at least one of the left and right rake units lifts above a ground surface when the at least one second hydraulic motor thereof is reversed to free the rake unit from a blockage.

5. A method for hydraulically controlling a stone picker that is connected to an agricultural tractor, the stone picker comprising:
a lifting rotor;
at least one first hydraulic motor configured to drive the lifting rotor;
a sieve comprising a sieve head arranged beneath the lifting rotor;
left and right rake units comprising center-oriented raking rotors;
at least one second hydraulic motor configured to drive the rake units; and
first, second, and third hydraulic cylinders, wherein
the first hydraulic cylinder comprises a drawbar pull cylinder configured to determine a pulling resistance applied by the stone picker,
the second hydraulic cylinder comprises a height adjusting cylinder, and
the third hydraulic cylinder comprises a control cylinder, the method comprising the steps of:
hydraulically separating the height adjusting cylinder from the at least one first hydraulic motor,
comparing a hydraulic pressure of the height adjusting cylinder with a hydraulic pressure of the at least one first hydraulic motor, and
adapting a length of the height adjusting cylinder to the pulling resistance of the stone picker and a rotation resistance of rotating work elements formed by the lifting rotor and the left and right rake units.

6. The method according to claim 5, wherein the control cylinder comprises at least one double acting control cylinder that hydraulically separates the height adjusting cylinder from the at least one first hydraulic motor, the method further comprising
connecting the at least one first hydraulic motor and the height adjustment cylinder to opposite chambers of the double acting control cylinder, wherein
the double acting control cylinder separates oil of the height adjustment cylinders from oil of the at least one first hydraulic motor, and
the control cylinder keeps a pressure relation between respective pressures in the circuits formed by said height adjusting cylinder and at least one first hydraulic motor on a level corresponding to an area relation between both chambers of the control cylinder.

7. The method according to claim 6, wherein the area relation of the control cylinder determines a ratio between (i) the rotation resistance, and (ii) the pulling resistance, wherein the ratio affects a length of the drawbar pull cylinder or the length of the height adjusting cylinder.

8. The method according to claim 6, wherein a hydraulic volume of the double acting control cylinder limits a motion range of the height adjusting cylinder corresponding to a load dependent depth control.

9. The method according to claim 7, wherein a hydraulic volume of the double acting control cylinder limits a motion range of the height adjusting cylinder corresponding to a load dependent depth control.

10. The method according to claim 5, wherein an oil is manually supplied to the height adjusting cylinder to displace the load dependent depth control.

11. The method according to claim 5 further comprising
connecting at least one lift cylinder of the left and right rake units to a return line of the at least one second hydraulic motor, and
installing a one way restrictor valve in a line connecting the at least one lift cylinder and the at least one second hydraulic motor to increase a pressure in the return line when the motor is reversed, such that at least one of the left and right rake units lifts above a ground surface when the at least one second hydraulic motor thereof is reversed to free the rake unit from a blockage, and
setting the rotor free from a blockage and simultaneous reducing a reverse speed of the rotor.

12. The method according to claim 6 further comprising
connecting at least one lift cylinder of the left and right rake units to a return line of the at least one second hydraulic motor, and
installing a one way restrictor valve in a line connecting the at least one lift cylinder and the at least one second hydraulic motor to increase a pressure in the return line when the motor is reversed, such that at least one of the left and right rake units lifts above a ground surface when the at least one second hydraulic motor thereof is reversed to free the rake unit from a blockage, and
setting the rotor free from a blockage and simultaneous reducing a reverse speed of the rotor.

13. The method according to claim 7 further comprising
connecting at least one lift cylinder of the left and right rake units to a return line of the at least one second hydraulic motor, and
installing a one way restrictor valve in a line connecting the at least one lift cylinder and the at least one second hydraulic motor to increase a pressure in the return line when the motor is reversed, such that at least one of the left and right rake units lifts above a ground surface when the at least one second hydraulic motor thereof is reversed to free the rake unit from a blockage, and
setting the rotor free from a blockage and simultaneous reducing a reverse speed of the rotor.

14. The method according to claim 8 further comprising
connecting at least one lift cylinder of the left and right rake units to a return line of the at least one second hydraulic motor, and
installing a one way restrictor valve in a line connecting the at least one lift cylinder and the at least one second hydraulic motor to increase a pressure in the return line when the motor is reversed, such that at least one of the left and right rake units lifts above a ground surface when the at least one second hydraulic motor thereof is reversed to free the rake unit from a blockage, and
setting the rotor free from a blockage and simultaneous reducing a reverse speed of the rotor.

15. The method according to claim 9 further comprising
connecting at least one lift cylinder of the left and right rake units to a return line of the at least one second hydraulic motor, and installing a one way restrictor valve in a line connecting the at least one lift cylinder and the at least one second hydraulic motor to increase a pressure in the return line when the motor is reversed, such that at least one of the left and right rake units lifts above a ground surface when the at least one second hydraulic motor thereof is reversed to free the rake unit from a blockage, and setting the rotor free from a blockage and simultaneous reducing a reverse speed of the rotor.

16. The method according to claim 10 further comprising connecting at least one lift cylinder of the left and right rake units to a return line of the at least one second hydraulic motor, and installing a one way restrictor valve in a line connecting the at least one lift cylinder and the at least one second hydraulic motor to increase a pressure in the return line when the motor is reversed, such that at least one of the left and right rake units lifts above a ground surface when the at least one second hydraulic motor thereof is reversed to free the rake unit from a blockage, and setting the rotor free from a blockage and simultaneous reducing a reverse speed of the rotor.

17. The method according to claim 5, wherein the sieve head is connected to the drawbar pull cylinder, the method further comprising determining a pulling resistance of the sieve head by the drawbar pull cylinder cooperating with a connection between the stone picker and the agricultural tractor.

* * * * *